(12) United States Patent
Gandrud et al.

(10) Patent No.: US 11,087,608 B2
(45) Date of Patent: Aug. 10, 2021

(54) CHARACTERIZING MONITORING ATTRIBUTES FOR OFFENDER MONITORING

(71) Applicant: ATTENTI ELECTRONIC MONITORING LTD., Tel Aviv (IL)

(72) Inventors: Jonathan Dale Gandrud, Woodbury, MN (US); Nicholas Andrew Asendorf, St. Paul, MN (US); Deepti Pachauri, St. Paul, MN (US); Gautam Singh, St. Paul, MN (US); Guruprasad Somasundaram, Minneapolis, MN (US); Jennifer Frances Schumacher, Woodbury, MN (US); Nitsan Ben-gal Nguyen, St. Paul, MN (US); Robert W. Shannon, Roseville, MN (US); Saber Taghvaeeyan, St. Paul, MN (US); Arash Sangari, St. Paul, MN (US); Himanshu Nayar, St. Paul, MN (US); Mojtaba Kadkhodaie Elyaderani, St. Paul, MN (US); James Bevan Snyder, St. Paul, MN (US); James William Howard, St. Paul, MN (US); David Solomon Segal, St. Paul, MN (US)

(73) Assignee: ATTENTI ELECTRONIC MONITORING LTD., Tel Aviv (IL)

( * ) Notice: Subject to any disclaimer, the term of this patent is extended or adjusted under 35 U.S.C. 154(b) by 0 days.

(21) Appl. No.: 16/603,258

(22) PCT Filed: Mar. 29, 2018

(86) PCT No.: PCT/IL2018/050373
§ 371 (c)(1),
(2) Date: Oct. 7, 2019

(87) PCT Pub. No.: WO2018/185748
PCT Pub. Date: Oct. 11, 2018

(65) Prior Publication Data
US 2021/0104143 A1   Apr. 8, 2021

Related U.S. Application Data

(60) Provisional application No. 62/483,238, filed on Apr. 7, 2017.

(51) Int. Cl.
*G08B 21/00*   (2006.01)
*G08B 21/02*   (2006.01)
(Continued)

(52) U.S. Cl.
CPC ........ *G08B 21/0269* (2013.01); *G06T 11/001* (2013.01); *G08B 7/06* (2013.01); *G06T 2200/24* (2013.01)

(58) Field of Classification Search
CPC .................... G08B 21/0269; G06T 11/001
(Continued)

(56) References Cited

U.S. PATENT DOCUMENTS

| | | | | |
|---|---|---|---|---|
| 5,731,757 A | * | 3/1998 | Layson, Jr. | .......... G08B 21/028 340/5.61 |
| 6,100,806 A | * | 8/2000 | Gaukel | .............. G08B 21/0283 340/573.4 |
| 2018/0184255 A1 | * | 6/2018 | Marson | ................. H04W 4/029 |

* cited by examiner

*Primary Examiner* — Tai T Nguyen
(74) *Attorney, Agent, or Firm* — Soroker Agmon Nordman

(57) ABSTRACT

In an example, a system comprises at least one body-worn tracking device (BWTD) configured to transmit location data that indicates a location of the BWTD and a computing system configured to communicate with the at least one BWTD. The computing system is configured to receive the location data from the at least one BWTD, determine, based on a set of weighted filters associated with at least one monitoring attribute, at least one gradient value correspond- (Continued)

ing to the location data, where the at least one gradient value represents a level of the at least one monitoring attribute, and perform at least one operation based on the at least one gradient value.

19 Claims, 7 Drawing Sheets

(51) Int. Cl.
*G06T 11/00* (2006.01)
*G08B 7/06* (2006.01)
(58) Field of Classification Search
USPC ..... 340/686.6, 539.13, 539.31, 10.41, 573.4; 342/357.52, 357.36, 357.74, 357.75; 701/455, 519
See application file for complete search history.

CHARACTERIZING MONITORING ATTRIBUTES FOR OFFENDER MONITORING

TECHNICAL FIELD

This disclosure relates to information systems for tracking geospatial location information related to monitored persons or objects.

BACKGROUND

Released criminal offenders on community supervision, either probation or parole, may be monitored with body-worn tracking devices (BWTDs) by a criminal justice supervising agency, such as a department of corrections or local law enforcement. The monitoring is based on a sentence, and often includes restricted regions and permissible regions with a schedule for the day of the week and a range of times associated with those areas when the released criminal offender is required to be or required not to be in those areas. A released criminal offender's geospatial location at a given date and time is monitored and recorded by tracking devices worn by the released criminal offender. This geospatial information, including date and time information, can be used to determine a released criminal offender's compliance with their sentence. Activities of released criminal offenders can be reported to the criminal justice supervising agency or to a probation or parole officer by fax, page, text message Or email generated by a monitoring center unique to the criminal justice supervising agency.

SUMMARY

Techniques of this disclosure are directed determining one or more values that represent a monitoring attribute for one or more body-worn tracking devices (BWTDs). In some instances, the techniques include determining a gradient value that represents a level of a monitoring attribute, e.g., on a gradation of compliance for the monitoring attribute. That is, the gradient value may be a quantitative value that represents whether a user wearing BWTD is complying with established rules or desired behaviors. In some instances, the techniques include generating a graphical representation of the gradient value. For example, a computing system may generate a graphical representation that includes a heat map of points corresponding to gradient values. The graphical representation may include points from a plurality of BWTDs. In this way, the techniques provide a manner by which to assign a variable value to, a variety of monitoring attributes, as well as illustrate the value in a manner that is meaningful to a supervising agency responsible for monitoring the BWTDs.

In an example, a system comprises at least one body-worn tracking device (BWTD) configured to transmit location data that indicates a location of the BWTD and a computing system configured to communicate with the at least one BWTD. The computing system is configured to receive the location data from the at least one BWTD, determine, based on a set of weighted filters associated with at least one monitoring attribute at least one gradient value corresponding to the location data, where the at least one gradient value represents a level of the at least one monitoring attribute, and perform at least one operation based on the at least one gradient value.

The details of one or more examples are set forth in the accompanying drawings and the description below. Other features, objects, and advantages of the disclosure will be apparent from the description and drawings, and from the claims.

DETAILED DESCRIPTION

Figure 1:
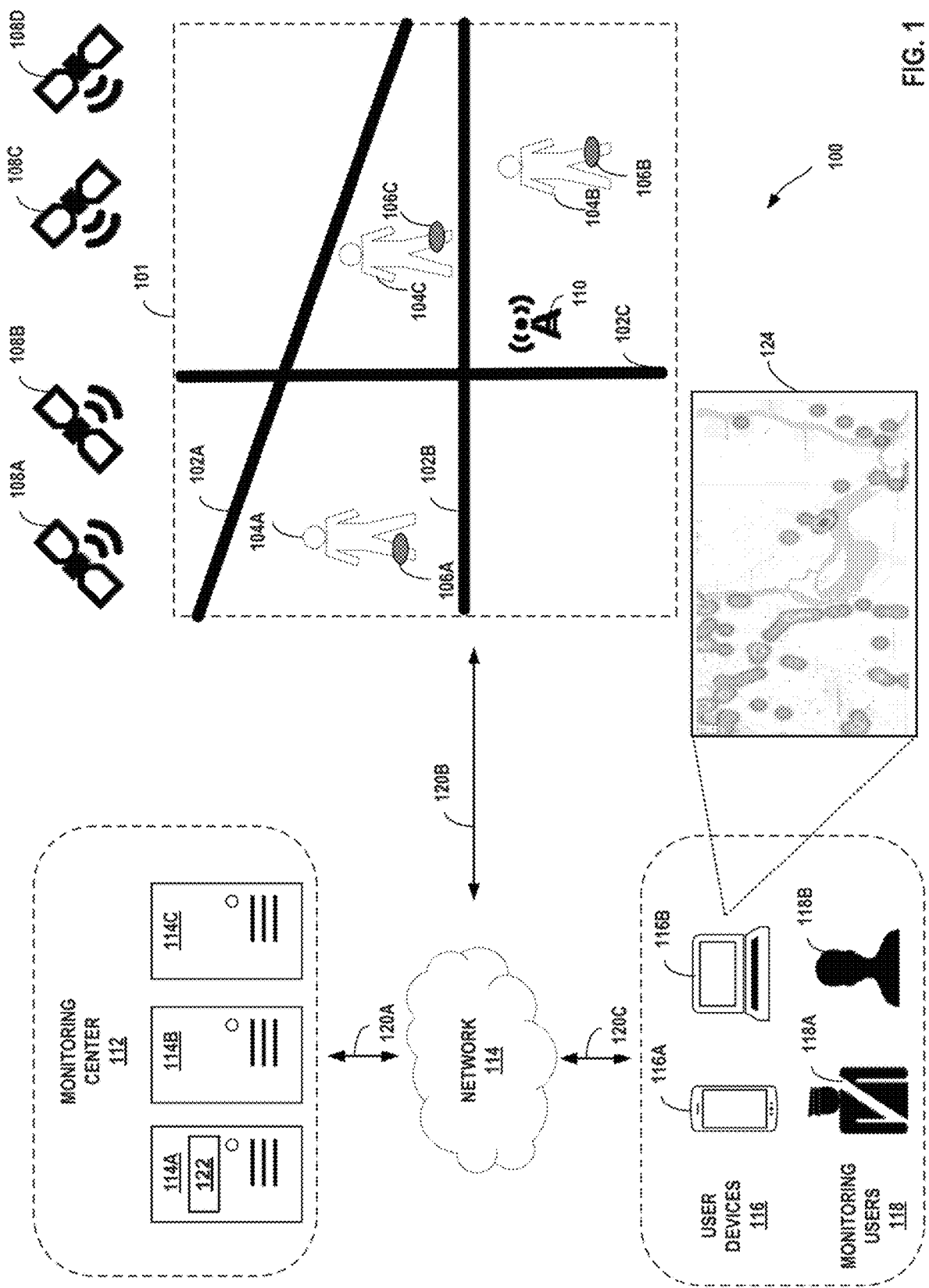
FIG. 1 illustrates an example system for determining one or more values that represent a monitoring attribute for one or more body-worn tracking devices, in accordance with techniques of this disclosure.

In an offender monitoring system, each offender may be assigned a device (e.g., body-worn tracking device (BWTD) that determines and stores a variety of data such as location, speed, heading, or the like at prescribed intervals (e.g., every minute). The device may alert an administrator at a supervising agency, such as a parole officer, when the offender violates the terms of his or her parole (e.g., by entering prohibited geographical zones). Server systems may house terabytes of historical data from BWTDs that stretch back more than a decade.

The techniques of this disclosure may utilize past and/or present data from BWTDs to determine whether a user wearing BWTD is complying with established rules or desired behaviors. For example, the techniques of this disclosure include determining one or more values that represent a monitoring attribute for one or more BWTDs. A monitoring attribute may be any characteristic of a BWTD or a user wearing the BWTD that may be determined based on data gathered from the BWTD and that may be of interest to a party monitoring the BWTD. Non-limiting examples of monitoring attributes include a location (e.g., latitude, longitude) of a BWTD, a density of BWTDs in a geographic area, a time of day, a global navigation satellite system (GNSS) signal strength, a directional heading, a type of offense of a user of a BWTD, a degree of offense of a user of a BWTD, a speed at which a BWTD is traveling, whether a BWTD is at rest, an ambient temperature in which a BWTD is located, whether a BWTD is in motion without a GNSS signal, whether a BWTD has committee a geographical violation (e.g., is located in a prohibited geographical location), or the like.

According to aspects of this disclosure, the determined value may be a gradient value that represents a level of a monitoring attribute, e.g., on a gradation for the monitoring attribute. That is, a gradient value may be any quantitative value that represents a characteristic of a BWTD or a user wearing the BWTD on a scale, which may provide insight as to whether the user wearing BWTD is complying with established rules or desired behaviors. The gradient value may be based on a set of weighted filters associated with at least one monitoring attribute. For example, each monitoring attribute may be assigned a weight, such that the attribute contributes relatively more or less to the gradient value according to the filter weight.

In some examples, according to aspects of this disclosure, a computing system may generate a graphical representation of offender monitoring data that includes one or more gradient values. The graphical representation may include data from one offender or multiple offenders. For example, a computing system may aggregate offender monitoring data from multiple offenders and represent gradient values determined from such data in a heatmap. The coloration of the points of the heatmap, which correspond to the determined gradient values, may represent the level of the attributes contributing to the gradient values. In one example, coloration of points of a heatmap may depict the density of offender movements. Such a heatmap may be based on a grid of geographic bins (of arbitrary granularity), where each bin (grid cell) is shaded or colored according to the number of offenders that appear within that cell within a temporal data inclusion window. In some instances, the computing system may weight heatmap points with temporal data, such that older points have less impact on the resulting density of the heatmap. In addition, the heatmap points may be filtered according to weights associated with a variety of attributes in order to provide additional insight to stakeholders.

FIG. 1 illustrates an example system 100 for determining one or more values that represent a monitoring attribute for one or more body-worn tracking devices, in accordance with techniques of this disclosure. FIG. 1 illustrates a geographic region 101, which may be a portion of the Earth's surface. Geographic region 101 includes multiple roads 102A-102C ("roads 102") on which monitored persons may travel. Geographic region 101 may include human (e.g., houses, buildings, and the like) and/or natural structures (trees, mountains, oceans, lakes, and the like). In some examples, geographic region 101 may be visually represented in a map, which may be two- or three-dimensional. Such maps may be output for display by computing devices as farther described in this disclosure. In the example of FIG. 1, a map generated based on geographic region 101 may be visually similar in appearance to the representation of geographic region 101 as illustrated in FIG. 1.

System 100 may track the location of one or more monitored persons 104A-104C ("monitored persons 104"). A monitored person may be any person wearing a BWTD, such as BWTD's 106A-106C which are respectively worn by monitored persons 104A-104C. In other examples, a "monitored person" may be interpreted as a non-human object to which a BWTD is attached. For instance, a monitored person may also be a vehicle, animal, or any other movable object that may be move to different locations in a geographic area. In examples where a monitored person is non-human, the BWTD may be any device that is attached to, accompanies or is otherwise physically associated with the movable object, even if not necessarily bodily worn.

In the example of FIG. 1, monitored persons 104 may be released criminal offenders, although in other examples monitored persons may be any person. Released criminal offenders may include criminal offenders who have been suspected, accused, or convicted of a crime and released from a jail or prison. In such scenarios, system 100 may monitor the location of monitored persons 104. For instance, when monitored person 104A is released from jail or prison, a BWTD may be attached by law enforcement to the body of monitored person 104A. As further described in this disclosure, the BWTD may have a unique device identifier that is associated with personally identifying information of monitored person in a monitor center. In this way, as monitored person 104A moves to different locations its a geographic region, geographic location points generated by the BWTD and stored at the monitoring center may be associated with or otherwise attributed to monitored person 104A, such that the location and/or whereabouts of person 104A may be monitored.

In the example of FIG. 1, each of monitored persons 104A-104C are respectively wearing a BWTD 104A-104C. BWTD 104A-104C may have similar or the same functionality and construction. BWTD 104A may be a portable computing device that determines the location of a monitored person and reports such locations to a monitoring center or other physically separate computing device. BWTD may include a physical housing constructed of plastic or any other suitable material. The housing may include electronics such as, but not limited to: one or more computer processors, one or more memories, one or more wired and/or wireless communication devices (e.g., GPS component, cellular network component, WiFi component, short-range (e.g., NFC, Bluetooth component, USB component), one or more output devices (e.g., haptic feedback component, lights, user interface display components, audio components), power sources (e.g., battery, power supply), and one or more printed circuit boards that physically, communicatively, and/or electronically couple such electronic devices to one another within the housing of the BWTD.

In some examples, a BWTD is a one-piece design in which GPS communication hardware and all other hardware for the BWTD are included in a single physical housing. In other examples, a BWTD may not include GPS communication hardware, which is physically separate, from but in communication with the BWTD. For instance, the monitored person may carry a physical device with GPS communication hardware (e.g., such as a telephone having GPS functionality), and separately the BWTD may be attached to the monitored person and in communication with the GPS communication hardware. Further details of the components included within a BWTD are illustrated and described in FIG. 3.

In some examples, BWTD 104A may further include a combination of software components and hardware components to perform one or more monitoring functions. For instance, BWTD 104A may include tracking component comprised of hardware and/or software that communicates with the GPS hardware component to determine and record GPS coordinates of BWTD 104A. In some examples, the location components sends such GPS coordinates of BWTD 104A to a monitoring center or other physically separate computing device.

BWTD 104A may include and notification component comprised of hardware and/or software that compares GPS coordinates of BWTD 104A to a set of restricted locations and/or regions and generates notifications. A restricted region may be a region in which a monitored person may not enter and a restricted location may be a location from which the monitored person (and therefore BWTD) must be separated from by at least a defined or specified distance. Data stored on a BWTD that define restricted locations and/or regions may be provided by a monitoring center or any other computing device that is physically separate from BWTD 104A.

BWTD 104A may include a communication component comprised of hardware and/or software that sends and receives data with a cellular network. The communication component may initiate, manage, and terminate communication sessions between cellular network infrastructure and BWTD 104A. Cellular network infrastructure may provide a wireless network for data communication to and from BWTD 104A over a geographically distributed area. In some examples, cellular network infrastructure may be owned and operated by a third-party, wireless or cellular carrier provider. Examples of such cellular networks may include a set of one or more geographically dispersed towers with radios, antennas and/or other communications components that provide for data communication with BWTD 104A using one or more protocols such as 2G, 3G, 4G, Long-Term Evolution (LTE), or any other suitable protocol. As BWTD 104A moves into and out of proximity of different towers, BWTD 104A may initiate and terminate communication sessions between BWTD 104A and the various towers, where a tower may be a Base Station Transceiver in a wireless communication network, such as a cellular network.

In some examples, BWTD 104E may include configuration component comprised of hardware and/or software to manage BWTD 104A. The management module may write data to memory of BWTD 104A that is received from a monitoring center or other physically separate computing device. Data may include restricted regions and/or restricted locations, configuration data to configure one or more components of BWTD 104A, information that uniquely identifies BWTD 104A and/or monitored person 104A that is wearing BWTD 104A, or any other suitable information.

Components such as the location component, enforcement component, cellular communication component, and management component may perform operations described herein using software, hardware, firmware, or a mixture of both hardware, software, and firmware residing in and executing on BWTD 104A or at one or more other remote computing devices. In some examples, BWTD 104A may execute its various components when embodied in software with one or more processors to perform the functionality described in this disclosure. BWTD 104A may execute any of such components as or within a virtual machine, user-space application, operating system or any other operating environment executing on underlying hardware.

As shown in FIG. 1, system 100 may include one or more satellites 108A-108D ("satellites 108"). In some examples satellites 108 may comprise a set of global navigation satellites in a global navigation satellite system (GNSS). Satellites 108 continuously transmit their current time and position. As described above, BWTD 104A may include a GPS component that monitors multiple satellites to determine the position of BWTD 104A. Although only four satellites 108A-108D are shown, different numbers of satellites may be used by BWTD 104A to determine the GPS coordinates of BWTD 104A at a point in time.

System 100 may also include one or more towers, such as tower 110 that form cellular network infrastructure. Tower 110 may include a physical structure that supports antennae, a GPS receiver, one or more sets of digital signal processors, transceivers, and control electronics, which collectively operate to establish sessions with end-user devices such as BWTDs, smartphones, or any other computing device. Tower 110, together with one or more other towers that include similar functionality, may be geographically dispersed, such as to provide a geographically dispersed wireless network for voice and/or data communication. Tower 110 and switching infrastructure (not shown) may be owned and operated by wireless or cellular carrier providers that charge customer/subscribers fees to operate on the wireless or cellular carrier provider.

Figure 2:
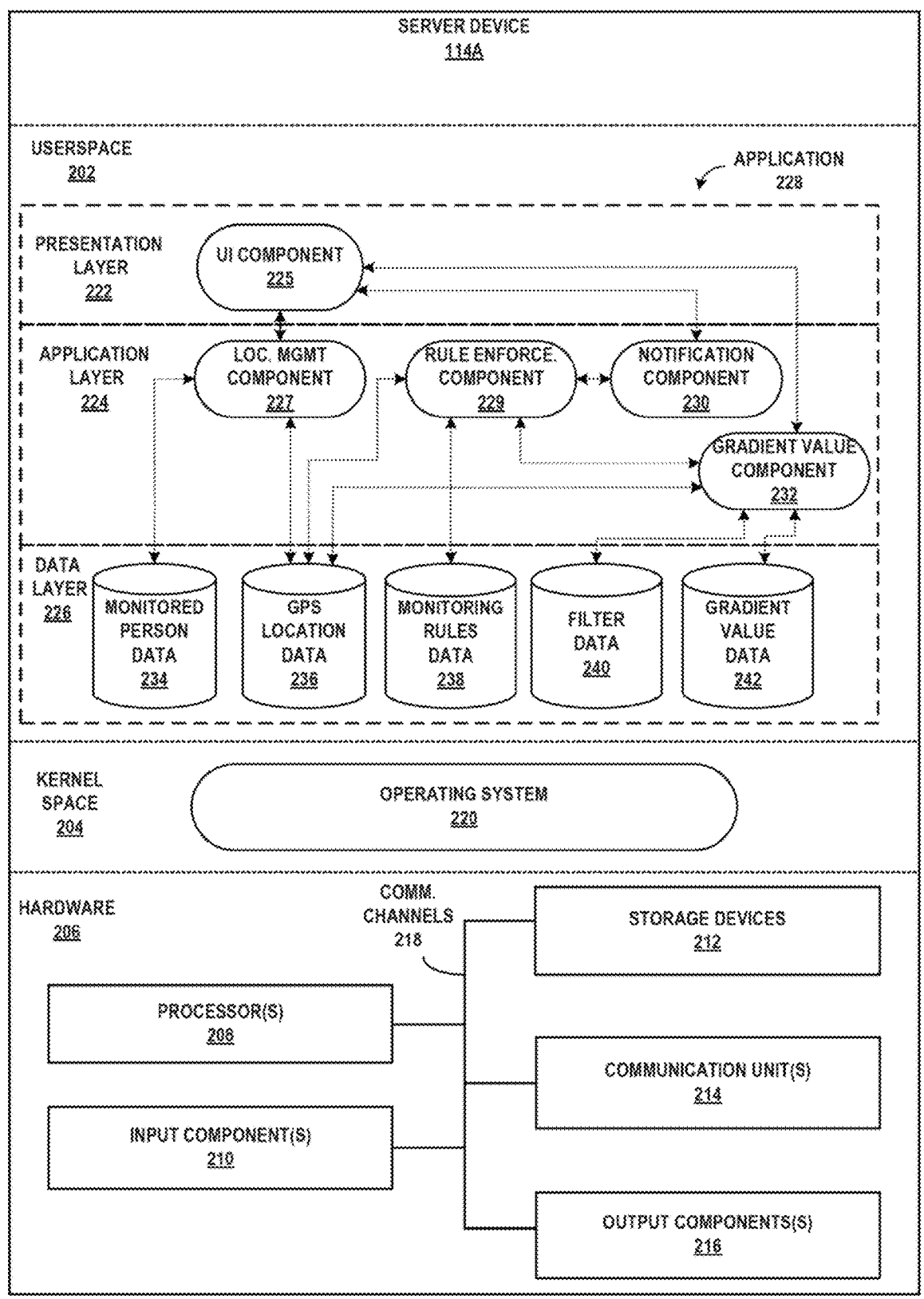
FIG. 2 is a block diagram illustrating an example computing device, in accordance with one or more aspects of the present disclosure.

FIG. 1 also includes monitoring center 112. Monitoring center 112 may be owned and operated by a private entity or a government entity. Monitoring center 112 may include one or more computing devices, such as server devices 114A-114C ("server devices 114"). Further details of the components included within server devices 114 is illustrated in FIG. 2. Server devices 114 may collectively provide a data center to monitor and track monitored persons based on, among other data, GPS coordinates of BWTDs that are provided to servers 112.

In some examples, service devices 114 may store an association between a monitored person and a respective BWTD worn by the monitored person. For instance, at the time that a law enforcement officer attaches a BWTD to the monitored person, the law enforcement officer may, using a separate, end-user computing device in communication with monitoring center 112, provide user input that creates an association between a unique identifier of the monitored person and a unique identifier of the BWTD. For instance, the association may be stored as a record in a database. As GPS coordinates are received by monitoring center 112 from the BWTD with the unique identifier of the BWTD, monitoring center 11 may store such GPS coordinates in association with the unique identifier of the BWTD. In this way, an operator of monitoring center 112 may determine the GPS coordinates associated with a particular monitored person.

Monitoring center 112 may receive configuration input from users, such as law enforcement officers, that define restricted locations and restricted regions. Such configuration input may be sent by a computing device of the user to monitoring center 112 via network 115. The configuration input may specify a unique identifier of the monitored person and/or BWTD and may also include properties such as named locations, perimeters, GPS coordinates or any other properties that may be used to define a restricted location and/or restricted region. By associating restricted locations and/or regions with a BWTD and/or monitored person wearing the BWTD, monitoring center 112 can determine violations, such as, determining whether a monitored person is operating within a restricted region and/or within a prohibited distance of a restricted location (e.g., a violation).

In some examples, monitoring center 112 determines that a monitored person is in violation of a restricted location or region, monitoring center may send one or more notifications. In some examples, monitoring center 112 may send a notification via network 115 to the BWTD for the violation, which may cause the BWTD to output an alert (e.g., haptic, visual, and/or audio feedback). In some examples, monitoring center 112, in response to detecting a violation, may send notifications to one or more other users, who may be associated with the monitored person who is in violation. For instance, to determine the one or more other users associated with the monitored person, monitoring center 112 may store within a record of a database a unique identifier of a law enforcement officer in association with a unique identifier of a monitored person.

Monitoring center 112 may generate user interfaces for display, such as maps that indicate different locations at which a monitored offender has been physically present. In some examples, monitoring center 112 may illustrate different locations at which a monitored offender has been physically present over a period of time. Monitoring center 112 may output any data that is stored in any suitable format including still and moving image data, audio data, and the like.

System 100 also includes user devices 116A-116B ("user devices 116") and monitoring users 118A-118B ("monitoring users 118") who use user devices 116. User devices 116 may be a computing device including, but not limited to a laptop computer, a tablet computer, a smartphone, a desktop computer, a server computer, a body worn computer (e.g., smartwatch, head-mounted device), or any other suitable computing device. User devices 116A and 116B may have similar or the same components and functionality, in some examples.

User device 116A may include one or more components comprised of a combination of hardware and software. For instance, user device 116A may execute a monitoring application implemented in software and executable on hardware of user device 116A. The monitoring application may provide notifications of violations, maps or other visual representations of monitored offender locations based on real-time or past-generated GPS coordinates. The monitoring application may also generate and send that associates a unique identifier of a BWTD with a unique identifier of a monitored person. In some examples, the monitoring application may natively implement functionality described in this disclosure, while in other examples the monitoring application may be a web-browser that accesses a web-based application with such functionality via a web-hosted application executing at monitoring center 112.

Monitoring users 118 may include law enforcement, parole officers, or any other public safety officials or employees. In some examples, monitoring users 118 may also include non-public safety offices/employees, such as past or potential victims of a monitored offender, school administrators, or any other potential user that may be interested in or need to know of the location or violations of a monitored offender. Monitoring users 118 may receive notifications by using user devices 116, which are sent by monitoring center 112.

Network 115 may represent a publicly accessible computer network that is owned and operated by a service provider, which is usually large telecommunications entity or corporation. Although not illustrated, service provider network 115 may be coupled to one or more networks administered by other providers, and may thus form part of a large-scale public network infrastructure, e.g., the Internet, Network 115 may provide computing devices such as BWTD, user devices, and monitoring center 112 with access to the Internet, and may allow the computing devices to communicate with each other. In some examples, network 115 may include one or more local area networks (LANs), such as user device devices 116 may communicate with monitoring center 112 through the Internet and/or a LAN on which both monitoring center 112 and user devices 116 are included.

Although additional network devices are not shown for ease of explanation, it should be understood that network 115 and system 100 may comprise additional network and/or computing devices such as, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. It should be understood that one or more additional network elements may be included along any of network links 120A-120C, such that the devices of system 110 are not directly coupled. Network links 120A-120C may be wired or wireless communication links, such as 100 Mbps, 1 Gbps, or 10 Gbps WiFi connections and/or physical cable connections, to name only a few examples.

In operation, in order to monitor a released criminal offender, such as monitored person 104A, a law enforcement officer, such as monitoring user 118A, may attach BWTD 106A to the ankle of monitored person 104A. In some examples, BWTD 106A may include a tamper-resistant strap that binds BWTD 106A to monitored person 104A. BWTD 106A may include one or more components comprised of hardware and/or software that detect if either the tamper-resistant strap and/or the housing/internal components of BWTD 106A have been tampered with by a monitored offender or other person. If BWTD 106A detects that tampering is or has occurred, then BWTD 106A may send a message via network 115 to monitoring center 112 to indicate the tampering event.

Upon attaching BWTD 106A to the ankle of monitored person 104A, monitoring user 118A may provide one or more user inputs to user device 116B that define an association between BWTD 106A and monitored person 104 in monitoring center 112. User device 116B, for example, may output for display a graphical user interface. The graphical user interface may include one or more user interface components, such as input fields, dropdown menus, labels or text fields, or any other graphical component through which a user may interact with user device 116B.

In the example of FIG. 1, monitoring user 118A may provide one or more inputs that specify or select a unique identifier of BWTD 106A and may further provide one or more user inputs that specify or select a unique identifier of monitored person 104A. Upon specifying or selecting the unique identifiers of BWTD 106A and/or monitored person 104A, monitoring user 118A may provide one or more user inputs to define an association between the respective unique identifiers. User device 116B may send one or more messages to monitoring center 112 that define in data, the association between the unique identifier of monitored person 104A and BWTD 106B.

In some examples, monitoring user 118A may specify other data in monitoring center 112 that is associated with BWTD 106B and/or monitored person. For instance, monitoring user 118A may provide one or more user inputs at user device 116B that specify restricted locations and/or restricted regions. Monitoring user 118A may provide one or more user inputs at user device 116B that specify permissible times or distances that a monitored person is allowed to travel or otherwise move about. Monitoring user 118A may provide one or more user inputs at user device 116B that specify one or more permissible locations and/or permissible regions. A permissible region may be a bounded region in which a monitored person must remain within and a permissible location may be a location from which the monitored person (and therefore BWTD) must be within at least a defined or specified distance. User device 116B may send one or more messages to monitoring center 112 with the data specified by monitoring user 118A, and monitoring center 112 may configure or associate the data with the unique identifier of monitored person 104A and BWTD 106B.

Upon monitoring user 118A attaching to and configuring BWTD 106A with monitored person 104A, monitored person 104A may be released from custody into the general public (i.e., released from a confined or restricted condition, such as a jail, prison, or courthouse). As monitored person 104A moves throughout a geographic region, such as geographic region 101, BWTD 106A determines respective GPS locations of BWTD 106A and sends messages to monitoring center 112 that include at least a unique identifier of BWTD 106A and/or monitored person 104A, unique tower identifier, GPS coordinates (latitude, longitude), and timestamps for when each respective GPS coordinate has been determined. BWTD 106A may send such messages through wireless communication with tower 110, which in turns sends the messages to monitoring center 112 via network 115, and in some examples one or more additional, intermediate networked devices (not shown in FIG. 1).

In this way, monitoring center 112, determines and stores the locations of monitored person 104A over time. Monitoring center 112 may determine whether monitored person 104A is in violation of a restricted location/region, a permissible location/region, a time period for permitted travel with respect to a restricted/permissible location/region, or any other property, rule, condition, or otherwise defined within or specified at monitoring center 112.

As noted above, one of service devices 114 may issue a notification or alert based on the occurrence of an event, such as upon determining that monitored person 104A has traveled to a restricted region (e.g., as indicated by location data from BWTD 106A). However, conventional monitoring techniques may not provide a comprehensive representation of the behavior of a monitored person. Moreover, data from multiple monitored persons is not typically aggregated.

According to aspects of this disclosure, monitoring center 112 may determine one or more gradient values 122 that represent a monitoring attribute for one or more BWTDs 106. In the example of FIG. 1, monitoring center 112 may store gradient values 122 to one of service devices 114. Gradient values 122 may represent a level of a monitoring attribute, e.g., on a gradation for the monitoring attribute. The monitoring attribute may include, as examples, a location (e.g., latitude, longitude) of one or more of BWTD 106, a density of BWTDs 106 in a geographic area, a time of day, a signal strength measured by BWTDs 106 (e.g., a signal strength between satellites 108 and BWTDs 106), a directional heading of BWTDs 106, a type of offense of monitored persons 104, a degree of offense of monitored persons 104, a speed at which BWTDs 106 are traveling, whether BWTDs 106 are at rest, an ambient temperature in which BWTDs 106 are located, whether BWTDs are in motion without a signal for determining location, whether BWTDs 106 have committee a geographical violation, or the like.

In general, gradient values 122 may be any quantitative value that represents a characteristic of BWTD 106 or monitored persons 104. Gradient values 122 may provide a non-binary representation of such characteristics. That is, rather than simply determining whether one of monitored persons 104 has violated a particular rule, monitoring center 112 may determine a variable representation of one or more attributes.

In a non-limiting example for purposes of illustration, with respect to a density of BWTDs 106 as a monitoring attribute, gradient values 122 may be based on a histogram of points corresponding to BWTDs 106. For example, as described in greater detail with respect to FIG. 4 below, a histogram may be composed of a number of cells, with each cell corresponding to a geographical region (such as geographic region 101). In this example, each cell may have a respective gradient value 122, where gradient values 122 are determined based on the number of points that appear within the cell.

In other examples, gradient values 122 may take a variety of other values. For example, gradient values 122 may be normalized. In this example, monitoring center 112 may determine gradient values 122 that are between zero and one (e.g., 0.17, 0.25, 0.59, or the like), with a relatively low gradient value corresponding to a relatively lower level of the relevant monitoring attribute(s). For example, again with respect to a density of BWTDs 106 as a monitoring attribute, gradient values 122 close to zero may indicate that the density of BWTDs 106 in geographic region 101 is relatively low, whereas gradient values 122 close to one may indicate that the density of BWTDs 106 in geographic region 101 is relatively high.

While the examples above are described with respect to a density monitoring attribute, in other examples, gradient values 122 may be based on more than one monitoring attribute. For example, monitoring center 112 may determine gradient values 122 based on a set of weighted filters associated with a plurality of monitoring attributes. As an example, monitoring center 112 may determine a set of weighted filters that include a density filter and a time filter. In this example, the monitoring attribute may be a time-based density of BWTDs 106 in geographical region 101 over a time defined by the time filter. Hence, monitoring center 112 may determine gradient value 122 that represents a time-based density. For example, gradient value 122 may represent not only a density of BWTDs 106 in geographical region 101, but also how much time BWTDs 106 are located in geographical region 101. In some examples, monitoring center 112 may apply a weighted time filter, such that location data captured more recently in time contributes more to gradient value 122. For example, monitoring center 112 may weight gradient value 122 based on a recency of location data from BWTDs 106.

As another example, monitoring center 112 may determine a set of weighted filters that include a type of offense filter. In this example, the monitoring attribute may be a type of offense committed by monitored persons 104. Hence, monitoring center 112 may determine gradient value 122 that represents a type of offense committed by monitored persons 104. That is, a relatively serious offense (e.g., homicide) may result in a relatively higher gradient value 122 than a relatively non-serious offense (e.g., petty theft). In some examples, the set of weighted filters may include the type of offense filter and a density filter, such that gradient value 122 represents a density of BWTDs 106 in geographical region 101 as well as the type of offenses committed monitored persons 104 associated with BWTDs 106.

As still another example, monitoring center 112 may determine a set of weighted filters that include a degree of offense filter. In this example, the monitoring attribute ma be a degree of offense committed by monitored persons 104 (e.g., a first-degree battery, second-degree battery, or the like). Hence, monitoring center 112 may determine gradient value 122 that represents a degree of offense committed by monitored persons 104. That is, a numerically lower degree of offense first-degree) may result in a relatively higher gradient value 122 than a numerically higher degree of offense (e.g., third-degree). In some examples, the set of weighted filters may include the degree of offense filter and a density filter, such that gradient value 122 represents a density of BWTDs 106 in geographical region 101 as well as the severity of offenses committed monitored persons 104 associated with BWTDs 106.

As still another example, monitoring center 112 may determine a set of weighted filters that include a speed filter. In this example, the monitoring attribute may be a speed with which one of BWTDs 106 (and, therefore, associated monitored person 104) are traveling. Hence, monitoring center 112 may determine gradient value 122 that represents a speed with which at least one BWTD 106 is traveling. For example, a relatively slow speed may result in a relatively higher gradient value 122 than a relatively higher speed, or vice versa. In some examples, the set of weighted fillers may include the speed filter and a location filter, such that gradient value 122 represents a speed of at least one of BWTDs 106 in a particular geographical region or proximate to a point of interest.

As still another example, monitoring center 112 may determine a set of weighted filters that include a time of day filter. In this example, the monitoring attribute may be a time of day at which location data from at least one of BWTDs 106 is gathered. Hence, monitoring center 112 may determine gradient value 122 that represents the time of day. For example, certain times of day (e.g., during business hours) may result in a relatively lower gradient value 122, while other times of day (e.g., nighttime hours) may result in a relatively higher gradient value 122. In some examples, the set of weighted filters may include the time of day filter and a location filter, such that gradient value 122 represents a time of day of at least one of BWTDs 106 in a particular geographical region or proximate to a point of interest.

As still another example, monitoring center 112 may determine a set of weighted filters that include a compliance filter. In this example, the monitoring attribute may be a measure of how compliant one or more monitored persons 104 with rules established for BWTDs 106. Hence, monitoring center 112 may determine gradient value 122 that represents a measure of compliance of monitored persons 104, e.g., well or poorly monitored persons 104 adhere to rules established for their BWTDs 106. For example, monitored persons 104 having a relatively large number of violations may result in a relatively higher gradient value 122. In some examples, the set of weighted filters may further include a density filter, such that gradient value 122 represents a density of monitored persons 104 having a relatively high number of violations.

As described herein, monitoring center 112 may determine gradient values 122 for one of monitored persons 104 or a plurality of monitored persons 104. That is, for example, monitoring center 112 may determine one or more gradient values 112 in isolation for monitored person 104A based on data from BWTD 106A. In other examples, monitoring center 112 may determine one or more gradient values 112 for a plurality of monitored persons 104 based on aggregated from BWTDs 106.

In instances in which monitoring center 112 determines gradient values 122 for a plurality of BWTDs 106, monitoring center 112 may determine the BWTDs 106 contributing to gradient values 122 based on characteristics of the BWTDs 106 or associated monitored persons 104. That is, monitoring center 112 may determine a subset of BWTDs 106 from which data is gathered to determine gradient values 122 based on characteristics of the BWTDs 106 or associated monitored persons 104. An example characteristic may include an offense committed by monitored persons 104, such that monitoring center 112 determines gradient values 122 for a population of BWTDs 106 associated with monitored persons 104 that have committed the same crime.

While specific examples are described above, it should be understood that gradient values 122 may be based on any combination of the weighted filters described. Moreover, it should be understood that the examples described above are intended to be non-limiting illustrations, and that other examples of monitoring attributes and corresponding filters are also possible.

According to some aspects, monitoring center 112 perform at least one operation based on gradient values 122. For example, as noted above, monitoring center 112 may determine that a monitored person is in violation of a restricted location or region and send one or more notifications. According to aspects of this disclosure, monitoring center 112 may maintain threshold values gradient values 122 and/or combinations of gradient values 122. Monitoring center 112 may generate and transmit notifications based on gradient values 122 being above or below the threshold values. In some examples, monitoring center 112 may send a notification via network 115 to the BWTD for the violation, which may cause the BWTD to output an alert (e.g., haptic, and/or audio feedback), in other examples, monitoring center 112 may send notifications to one or more other users, who may be associated with the monitored person who is in violation.

In some instances, monitoring center 112 may perform an operation based on gradient values 122 that includes generating a graphical user interface (GUI) that includes a graphical representation of gradient values 122. For example, monitoring center 112 may generate and transmit GUI 124 for transmission to and display by one or more of user devices 116.

In the example of FIG. 1, GUI 124 includes a graphical representation of geographical region 101. In some examples, as described herein, the representation may include a grid of bins that correspond to geographical region 101. The grid of bins may have any granularity. That is, the size of the geographic region that corresponds to a particular bin may vary. Monitoring center 112 may determine, for respective bins of the grid of bins, a variable display attribute that varies based on gradient values 122. For example, the display attribute may be coloration, such that monitoring center 112 determines a color for a bin based on gradient values 122. That is, a higher gradient value 122 for a bine may result in a different color or a different transparency of a color than a lower gradient value 122 for the bin.

GUIs having geographic regions with different colorations may be referred to herein as heatmaps. For example, monitoring center 112 may determine gradient values 122 corresponding to a density of offender monitoring attribute. In this example, monitoring center 112 may generate GUI 124 having geographic regions with a relatively high density of monitored persons 104 (e.g., as indicated by gradient values 122) to be differently colored than geographic regions having a relatively low density of monitored persons 104.

In some instances, monitoring center 112 may also generate GUI 124 to include graphical elements that represent monitoring attributes. For example, monitoring center 112 may generate GUI 124 to include graphical arrows that indicate a directional heading for one or more monitored persons 104. As another example, monitoring center 112 may generate GUI 124 to include graphical elements that indicate a whether one or more of BWTDs 106 is at rest, whether BWTDs 106 that are in motion but not communicating with satellites 108, whether BWTDs 106 are located outside of a permissible geographical region, or the like.

FIG. 2 is a block diagram illustrating an example computing device, in accordance with one or more aspects of the present disclosure. FIG. 2 illustrates only one particular example of server device 114A in monitoring center 112, as shown in FIG. 1. Many other examples of server device 114A may be used in other instances and may include a subset of the components included in example server device 114A or may include additional components not shown example server device 114A in FIG. 2. In some examples, server device 114A may be a server, tablet computing device, smartphone, wrist- or head-worn computing device, laptop, desktop computing device, or any other computing device that may run a set, subset, or superset of functionality included in application 228.

As shown in the example of FIG. 2, server device 114A may be logically divided into user space 202, kernel space 204, and hardware 206. Hardware 206 may include one or more hardware components that provide an operating environment for components executing in user space 202 and kernel space 204. User space 202 and kernel space 204 may represent different sections or segmentations of memory, where kernel space 204 provides higher privileges to processes and threads than user space 202. For instance, kernel space 204 may include operating system 220, which operates with higher privileges than components executing in user space 202.

As shown in FIG. 2, hardware 206 includes one or more processors 208, input components 210, storage devices 212, communication units 214, and output components 216. Processors 208, input components 210, storage devices 212, communication units 214, and output components 216 may each be interconnected by one or more communication channels 218. Communication channels 218 may interconnect each of the components 208, 210, 212, 214, and 216 for inter-component communications (physically, communicatively, and/or operatively). In some examples, communication channels 218 may include a hardware bus, a network connection, one or more inter-process communication data structures, or any other components for communicating data between hardware and/or software.

One or more processors 208 may implement functionality and/or execute instructions within server device 114A. For example, processors 208 on server device 114A may receive and execute instructions stored by storage devices 212 that provide the functionality of components included in kernel space 204 and user space 202. These instructions executed by processors 208 may cause server device 114A to store and/or modify information, within storage devices 212 during program execution. Processors 208 may execute instructions of components in kernel space 204 and user space 202 to perform one or more operations in accordance with techniques of this disclosure. That is, components included in user space 202 and kernel space 204 may be operable by processors 208 to perform various functions described herein.

One or more input components 210 of server device 114A may receive input. Examples of input are tactile, audio, kinetic, and optical input, to name only a few examples. Input components 210 of server device 114A, in one example, include a mouse, keyboard, voice responsive system, video camera, buttons, control pad, microphone or any other type of device for detecting input from a human or machine. In some examples, input component 210 may be a presence-sensitive input component, which may include a presence-sensitive screen, touch-sensitive screen, etc.

One or more output components 216 of server device 114A may generate output. Examples of output are tactile, audio, and video output. Output components 216 of server device 114A, in some examples, include a presence-sensitive screen, sound card, video graphics adapter card, speaker, cathode ray tube (CRT) monitor, liquid crystal display (LCD), or any other type of device for generating output to a human or machine. Output components may include display components such as cathode ray tube (CRT) monitor, liquid crystal display (LCD), Light-Emitting Diode (LED) or any other type of device for generating tactile, audio, and/or visual output.

Output components 216 may be integrated with server device 114A in some examples. In other examples, output components 216 may be physically external to and separate from server device 114A, but may be operably coupled to server device 114A via wired or wireless communication. An output component may be a built-in component of server device 114A located within and physically connected to the external packaging of server device 114A (e.g., a screen on a mobile phone). In another example, presence-sensitive display 202 may be an external component of server device 114A located outside and physically separated from the packaging of server device 114A (e.g., a monitor, a projector, etc. that shares a wired and/or wireless data path with a tablet computer). Output components 216 may provide haptic, vibratory or other tactile output.

One or more communication units 214 of server device 114A may communicate with external devices by transmitting and/or receiving data. For example, server device 114A may use communication units 214 to transmit and/or receive radio signals on a radio network such as a cellular radio network. In some examples, communication units 214 may transmit and/or receive satellite signals on a satellite network such as a Global Positioning System (GPS) network. Examples of communication units 214 include a network interface card (e.g. such as an Ethernet card), an optical transceiver, a radio frequency transceiver, a GPS receiver, or any other type of device that can send and/or receive information. Other examples of communication units 214 may include Bluetooth®, GPS, 3G, 4G, and Wi-Fi® radios found in mobile devices as well as Universal Serial Bus (USB) controllers and the like.

One or more storage devices 212 within server device 114A may store information for processing during operation of server device 114A. 1n some examples, storage device 212 is a temporary memory, meaning that a primary purpose of storage device 212 is not long-term storage. Storage devices 212 on server device 114A may configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art.

Storage devices 212, in some examples, also include one or more computer-readable storage media. Storage devices 212 may be configured to store, larger amounts of information than volatile memory. Storage devices 212 may further be configured for long-term storage of information as non-volatile memory space and retain information after activate/off cycles. Examples of non-volatile memories include magnetic hard discs, optical discs, floppy discs, flash memories, or forms of electrically programmable memories (EPROM) or electrically erasable and programmable (EEPROM) memories. Storage devices 212 may store program instructions and/or data associated with components included in user space 202 and/or kernel space 204.

As shown in FIG. 2, application 228 executes in userspace 202 of server device 114A. Application 228 may be logically divided into presentation layer 222, application layer 224, and data layer 226. Presentation layer 222 may include user interface (UI) component 124, which generates and renders user interfaces of application 228. Application layer 224 may include location management component (LMC) 227, rule enforcement component (REC) 229, notification component 230, and gradient value component (GVC) 232. Presentation layer 222 may include UI component 225.

Data layer 226 may include one or more datastores. A datastore may store data in structure or unstructured form. Example datastores may be any one or more of a relational database management system, online analytical processing database, table, or any other suitable structure for storing data. Monitored person data 234 may include information descriptive of monitored persons and/or monitoring users. Example data, may include unique identifier for monitored person or user, name, address, phone number, notes, or any other descriptive information of a monitored person or monitored person, such as a type of offense, a degree of offense (e.g., a legal degree of offense, such as second degree battery), or the like.

GPS location data 236 may include GPS locations of BWTDs and other data associated with the GPS locations. For instance, a record or other instance of GPS location data may include, but is not limited to, any one or more of unique identifier of BWTD and/or monitored person wearing BWTD, timestamp, GPS coordinates (latitude, longitude), GPS signal strength, signal strength of cellular tower, and directional heading of BWTD, speed at which a BWTD is traveling, whether a BWTD is at rest, an ambient temperature in which a BWTD is located, whether a BWTD is in motion without a GPS signal, or the like. The data included in a record or other instance of GPS location data in GPS location data 236 may be a triple or set of data sent by a BWTD to monitoring center 112, as described in FIG. 1.

Data layer 226 also includes monitoring rules data 238. Monitoring rules data 238 may include data that defines, one or more of: a restricted location/region, a permissible location/region, a time period for permitted travel with respect to a restricted/permissible location/region, permissible/restricted users who can or cannot be within a threshold distance of the monitored person, or any other property, rule, condition, to name only a few examples. In some instances, the monitoring rules defined by monitoring rules data 238 may be established based on conditions of release or parole of a monitored person. However, the monitoring rules need not be court mandated.

Data layer 226 also includes filter data 240. According to aspects of this disclosure, filter data 240 may include weighted filters for generating gradient values (such as gradient values 122 (FIG. 1)) from GPS location data 236 or other data collected from BWTDs 106. Filter data 240 may include weights to be applied to data associated with a particular monitoring attribute, such that the monitoring attribute contributes relatively more or less to a gradient value based on the weight. In an example for purposes of illustration, filter data 240 may include a weight that corresponds to a density monitoring attribute (e.g., a density of BWTDs in a given geographical area). The weight may result in a relatively higher gradient value when the density of BWTDs 106 is high and a relatively lower gradient value when the density of BWTDs 106 is low.

Data layer 226 also includes gradient value data 242. According to aspects of this disclosure gradient value data 242 may include gradient values determined by gradient value component 232. In general, gradient value data 242 may include any quantitative values that represent one or more characteristics of BWTDs 106 or monitored persons 104. For example, as described above with respect to FIG. 1, gradient value data 242 may be based on a histogram of points corresponding to BWTDs 106. In other examples, gradient value data 242 may include a variety of other values.

In operation, BWTD 106A may be attached and assigned to monitored person 104A. LMC 227 may receive a unique identifier of BWTD 106A and/or a unique identifier of monitored person 104A. LMC 227 may store data defining an association between the unique identifier of BWTD 106A and the unique identifier of monitored person 104A. As monitored person 104A moves within one or more different geographic regions, LMC 227 may receive location data from BWTD 106A including, but not limited to: a unique identifier of BWTD 106A and/or monitored person wearing BWTD 106A, GPS coordinates (latitude, longitude), a timestamp when the GPS coordinates (latitude, longitude) were determined, GPS signal strength when the GPS coordinates (latitude, longitude) were determined, signal strength of a tower when the GPS coordinates (latitude, longitude) were determined, and/or a directional heading of BWTD 106A when the GPS coordinates (latitude, longitude) were determined. LMC 227 may store such location data within GPS location data 236.

According to aspects of this disclosure, gradient value component 232 gradient value component 232 may determine one or more gradient values based on filter data 240 associated with one or more monitoring attributes. As described above with respect to FIG. 1, non-limiting examples of monitoring attributes include a location (e.g., latitude, longitude) of one or more of BWTD 106, a density of BWTDs 106 in a geographic area, a time of day, a signal strength measured by BWTDs 106 (e.g., a signal strength between satellites 108 and BWTDs 106), a directional heading of BWTDs 106, a type of offense of monitored persons 104, a degree of offense of monitored persons 104, a speed at which BWTDs 106 are traveling, whether BWTD 106 are at rest, an ambient temperature in which BWTDs 106 are located, whether BWTDs are in motion without a signal for determining location, whether BWTDs 106 have committee a geographical violation, or the like.

Gradient value component 232 may generate and store the gradient values as gradient value data 242. For example, gradient value component 232 may determine gradient value data 242 based on a set of weighted filters stored as filter data 240 associated with one or more monitoring attributes. The set of weighted filters may include, as non-limiting examples, a density filter, a time filter, a type of offense filter, a degree of offense lifter, a speed filter, a time of day filter, a compliance filter, or the like. In some examples, gradient value component 232 may apply a weighted time filter, such that location data captured more recently in time is weighted more heavily than older data. As described herein, gradient value component 232 may determine gradient value data 242 for one of monitored persons 104 or a plurality of monitored persons 104.

REC 229 may determine whether any other property, rule, condition of monitoring rules data 238 is satisfied, and which may include data that defines, one or more of a restricted location/region, a permissible location/region, a time period for permitted travel with respect to a restricted/permissible, location/region, permissible/restricted users who can or cannot be within a threshold distance of the monitored person, or any other property, rule, condition. For instance, REC 229 may determine whether any other property, rule, condition is satisfied based on receiving one or more of GPS locations from LMC 227, GPS location data 236, and monitoring rules data 238. REC 229 may cause notification component 230 to send a notification to user devices of one or more monitoring users, and the notification may indicate a violation.

According to aspects of this disclosure, REC 229 may determine whether gradient values from gradient value component 232 exceed a threshold value. For example, REC 229 may access threshold values gradient values stored to monitoring rules data 238. REC 229 may determine a violation based on whether gradient values are above or below the threshold gradient values. Again, REC 229 may cause notification component 230 to send a notification to user devices of one or more monitoring users that indicates the violation.

Notification component 230 may send notifications (or messages) to computing devices external to server device 114A that cause such computing devices to output alerts, which may be visual, audio, haptic or any other type of discernable feedback. In this way, violations, statuses, or any other information may be communicated to devices of monitored persons and monitoring users. In some examples, events that cause notifications or messages to be sent by notification component 230 may also be logged by LMC 227, REC 229, and/or notification component 230 in monitored person data 234.

In some examples, UI component 225 may act as an intermediary between various components and modules of server device 114A to process and send input detected by input devices to other components and modules, and generate output from other components and modules that may be presented at one or more output devices. For instance, UI component 225 may generate one or more user interfaces for display, which may include data and/or graphical representations of maps, alerts, reports, or other communications as described in this disclosure.

According to aspects of this disclosure, UI component 225 may generate a graphical user interface (GUI) that includes a graphical representation of gradient value data 242 from gradient value component 232. As described above with respect to the example of FIG. 1, the graphical representation may include a map of a geographical region. UI component 225 may generate content (e.g., graphical elements, coloration, or the like) to be overlaid on the map based on gradient value data 242. In some examples, UI component 225 may generate for display the images shown in FIGS. 4-6, as described in greater detail below.

Figure 3:
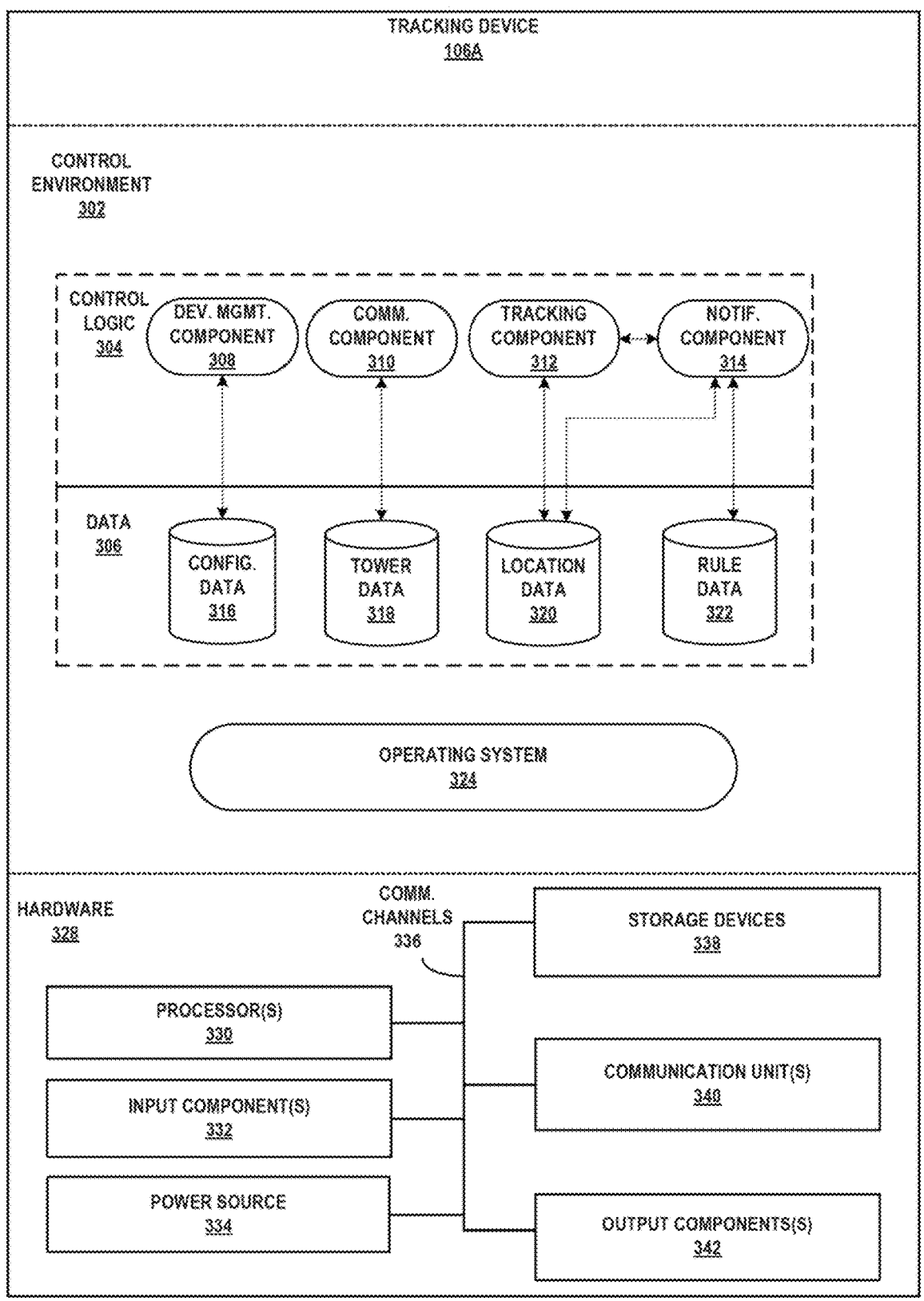
FIG. 3 is a block diagram illustrating an example tracking device, in accordance with one or more aspects of the present disclosure.

FIG. 3 is a block diagram illustrating an example tracking device, in accordance with one or more aspects of the present disclosure. FIG. 3 illustrates only one particular example of BWTD 106A, as shown in FIG. 1. Many other examples of BWTD 106A may be used in other instances and may include a subset of the components included in example BWTD 106A or may include additional components not shown BWTD 106A in FIG. 3. In some examples, BWTD 106A may run a set, subset, or superset of functionality included in control logic 304. In some examples, the external housing (not shown) of BWTD 106A may have one or more attachment components (not shown), such as straps, fasteners, magnetic materials, adhesive materials or any other mechanism or material for attaching or associating with tracking device 106A with an object to be tracked.

As shown in the example of FIG. 3, BWTD 106A may be logically divided into control environment 302 and hardware 328. Hardware 328 may include one or more hardware components that provide an operating environment for components executing in control environment 302. Control environment 302 may include operating system 324, which or may not operate with higher privileges than other components executing in user space 202.

As shown in FIG. 2, hardware 328 includes one or more processors 330, input components 332, power source 334 storage devices 338, communication units 340, and output components 342. Processors 328, input components 332, power source 334, storage devices 338, communication units 340, and output components 342 may each be interconnected by one or more communication channels 336. Communication channels 336 may interconnect each of the components 330, 332, 334, 338, 340, and 342 for inter-component communications (physically, communicatively, and/or operatively). In some examples, communication channels 336 may include a hardware bus, a network connection, one or more inter-process communication data structures, or any other components for communicating data between hardware and/or software.

One or more processors 330 may implement functionality and/or execute instructions within BWTD 106A. For example, processors 330 on BWTD 106A may receive and execute instructions stored by storage devices 338 that provide the functionality of components included in control environment 302. These instructions executed by processors 330 may cause BWTD 106A to store and/or modify information, within storage devices 338 during program execution. Processors 330 may execute instructions of components in control environment 302 to perform one or more operations in accordance with techniques of this disclosure. That is, components included in user control environment 302 may be operable by processors 330 to perform various functions described herein.

One or more input components 332 of BWTD 106A may receive input. Examples of input are tactile, audio, kinetic, and optical input, to name only a few examples. Input components 332 of BWTD 106A, in one example, include a voice responsive system, video camera, buttons, control pad, microphone or any other type of device for detecting input from a human or machine. In some examples, input component 210 may be a presence-sensitive input component, which may include a presence-sensitive screen, touch-sensitive screen, etc.

One or more output components 342 of BWTD 106A may generate output. Examples of output are tactile, audio, and video output. Output components 342 of BWTD 106A, in some examples, include a presence-sensitive screen, sound card, video graphics adapter card, speaker, cathode ray tube (CRT) monitor, liquid crystal display (LCD), or any other type of device for generating output to a human or machine. Output components may include display components such as cathode ray tube (CRT) monitor, liquid crystal display (LCD), Light-Emitting Diode (LED) or any other type of device for generating tactile, audio, and/or visual output. Output components 106A may be integrated with BWTD 106A in some examples. In other examples, output components 342 may be physically external to and separate from BWTD 106A, but may be operably coupled to BWTD 106A via wired or wireless communication. An output component may be a built-in component of BWTD 106A located within and physically connected to the external packaging of BWTD 106A. In another example, output components 342 may be an external component of BWTD 106A located outside and physically separated from the packaging or housing of BWTD 106A. Output components 342 may provide haptic, vibratory or other tactile output.

One or more communication units 340 of BWTD 106A may communicate with external devices by transmitting and/or receiving data. For example, BWTD 106A may use communication units 340 to transmit and/or receive radio signals on a radio network such as a cellular radio network. In some examples, communication units 340 may transmit and/or receive satellite signals on a satellite network such as a Global Positioning System (GPS) network. Examples of communication units 340 include a network interface card (e.g. such as an Ethernet card), an optical transceiver, a radio frequency transceiver, a GPS receiver, or any other type of device that can send and/or receive information. Other examples of communication units 340 may include Bluetooth®, GPS, 3G, 4G, and Wi-Fi® radios found in mobile devices as well as Universal Serial Bus (USB) controllers and the like.

One or more storage devices 338 within BWTD 106A may store information for processing during operation of BWTD 106A. In some examples, storage device 338 is a temporary memory, meaning that a primary purpose of storage device 338 is not long-term storage. Storage devices 338 on BWTD 106A may configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art.

Storage devices 338, in some examples, also include one or more computer-readable storage media. Storage devices 338 may be configured to store larger amounts of information than volatile memory. Storage devices 338 may further be configured for long-term storage of information as non-volatile memory space and retain information after activate/off cycles. Examples of non-volatile memories include magnetic hard discs, optical discs, floppy discs, flash memories, or forms of electrically programmable memories (EPROM) or electrically erasable and programmable (EEPROM) memories. Storage devices 338 may store program instructions and/or data associated with components included in control environment 302.

As shown in FIG. 2, BWTD 106A may include a power source 334. In some examples, power source 334 may be a battery. Power source 334 may provide power to one or more components of BWTD 106A. Examples of power source 334 may include, but are not necessarily limited to, batteries having zinc-carbon, lead-acid, nickel cadmium (NiCd), nickel metal hydride (NiMH), lithium ion (Li-ion), and/or lithium ion polymer (Li-ion polymer) chemistries, in some examples, power source 334 may have a limited capacity (e.g., 1000-3000 mAh).

As shown in FIG. 2, control logic 304 executes in control environment 302 of 334. Control logic 304 may include but is not limited to: device management component (DMC) 308, communication component 310, tracking component 312, and notification component 314. Data 306 may include one or more datastores. A datastore may store data in structure or unstructured form. Example datastores may be any one or more of a relational database management system, online analytical processing database, table, or any other suitable structure for storing data.

Configuration data 316 may include one or more of: a unique identifier of BWTD 106A, a unique identifier of the monitored person to which BWTD 106A is assigned, and/or any other properties or parameters that control or change the operation of tracking device 106A. Tower data 318 may include records, tuples or sets, wherein each record, tuple or set specifies one or more of a unique identifier of a particular tower, a latitude and longitude of BWTD 106A when BWTD 106A detected or initiated a communication session with the particular tower, a signal strength for the tower when BWTD 106A detected or initiated a communication session with the particular tower, a directional heading of BWTD 106A when BWTD 106A detected or initiated a communication session with the particular tower, and/or a timestamp when BWTD 106A detected or initiated a communication session with the particular tower.

Data 306 may include location data 320. Location data 320 may include records, tuples or sets, wherein each record, tuple or set specifies one or more of a unique identifier of BWTD 106A and/or monitored person wearing BWTD 106A, GPS coordinates (latitude, longitude), a timestamp when the GPS coordinates (latitude, longitude) were determined, GPS signal strength when the GPS coordinates (latitude, longitude) were determined, signal strength of a tower when the GPS coordinates (latitude, longitude) were determined, and/or a directional heading of BWTD 106A when the GPS coordinates (latitude, longitude) were determined.

Rule data 322 may include data that defines, one or more of a restricted location/region, a permissible location/region, a time period for permitted travel with respect to a restricted/permissible location/region, permissible/restricted users who can or cannot be within a threshold distance of the monitored person, or any other property, rule, condition, to name only a few examples.

In operation, DMC 308 may initially be configured with configuration data 316. For instance, DMC 308 may be programmed, from an external computing device, with a unique identifier for BWTD 106A and/or a unique identifier of the monitored person associated with or assigned to BWTD 106A. Once BWTD 106A has been configured with configuration data 316, the monitored person may move about one or more geographic regions.

Communication component 310 may initiate, manage, and term ma communication sessions with towers that provide cellular network infrastructure. In particular, as BWTD 106A moves to different geographic regions, communication component 310 may initiate communication sessions with different towers in the different regions. In this way, communication component 310 maintains communication between BWTD 106A and monitoring center 112.

Tracking component 312 may determine the GPS location of BWTD 106A based on GPS signals received from GPS satellites, such as satellites 108 in FIG. 1. For instance, tracking component 312 may determine the latitude and longitude of BWTD 106A at a particular point time. Tracking component 312 may determine the latitude and longitude on a periodic basis according to an interval that may be included in configuration data 312. The time interval may be programmed by a user, dynamically changed (e.g., based on one or more detected or determined events) or hard-coded. At a point in time (e.g., when a time interval has elapsed), upon determining the latitude and longitude, tracking component 312 may generate and store a record, tuple or set that specifies one or more of: a unique identifier of BWTD 106A and/or monitored person wearing BWTD 106A, GPS coordinates (latitude, longitude), a timestamp when the GPS coordinates (latitude, longitude) were determined, GPS signal strength when the GPS coordinates (latitude, longitude) were determined, signal strength of a tower when the GPS coordinates (latitude, longitude) were determined, and/or a directional heading of BWTD 106A when the GPS coordinates (latitude, longitude) were determined. Tracking component 312 may send location data 320 to monitoring center 320 in real-time, periodically, or asynchronously, as described in sorry examples of FIG. 1.

Notification component 314 may receive notifications from external computing de ices such as monitoring center 112 and/or user devices 116, as show in FIG. 1. Notification component 314 may generate and send notifications to one or more external computing devices such as monitoring center 112 and/or user devices 116. In some examples, notifications generated by notification component 314 may be based on rule data 322. For instance, if a rule or condition specified in rule data 322 is satisfied by a GPS coordinate determined by tracking component 312, then notification component may send a notification to one or more of monitoring center 112 and/or user devices 116. In some examples, if a rule or condition specified in rule data 322 is satisfied by a GPS coordinate determined by tracking component 312, then notification component 314 may cause one or more of output components 342 to provide an alert, such as haptic, audio, or visual feedback. In some examples, in response to receiving a notification from an external computing device, notification component 314 may cause one or more of output components 342 to provide an alert, such as haptic, audio, or visual feedback.

While typically performed by a server device (such as server device 114A described with respect to the example of FIG. 2 above) due to restrictions in processing, power, data storage, or the like, in some examples, tracking device 106A may perform all or a subset of the techniques described herein for determining one or more values that represent a monitoring attribute of one or more body-worn tracking devices. For example, notification component 314 may determine one or more gradient values from location data 320 and generate notifications based on such gradient values. In this example, rule data 322 may include filter data associated with monitoring attributes. Notification component 314 may determine gradient values and issue alerts or generate a variety of user interfaces for display (in instances in which tracking device 106A includes a display component).

Figure 4:
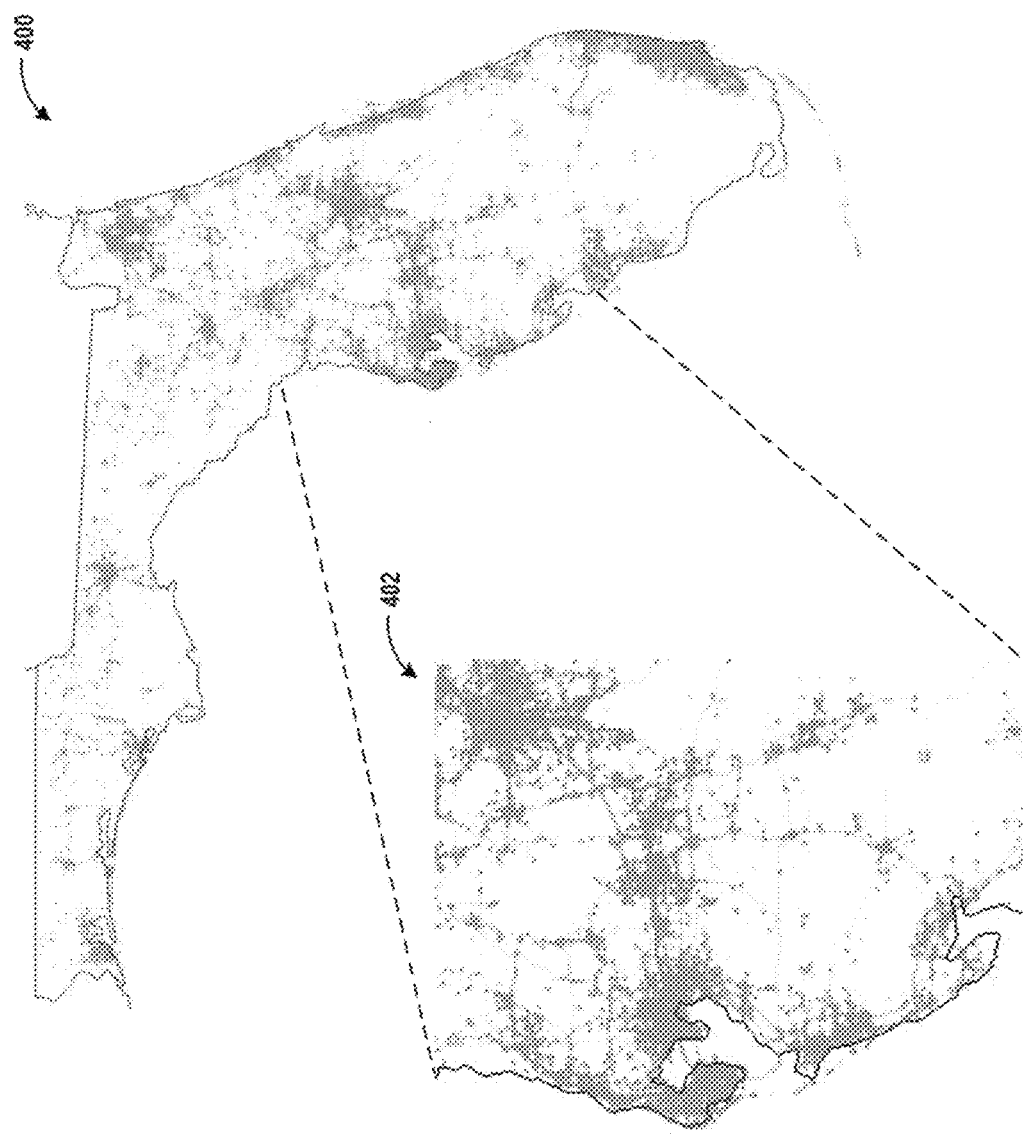
FIG. 4 is an illustration of a graphical user interface generated for display by a computing device, in accordance with techniques of this disclosure.

FIG. 4 is an illustration of a graphical user interface generated for display by a computing device, in accordance with techniques of this disclosure. According to aspects of this disclosure, the graphical content shown in the example of FIG. 4 may be generated by component 225 (FIG. 2) based on determined gradient values for a plurality of monitored persons 104 (FIG. 1).

FIG. 4 generally illustrates a map 400 of Florida with inset 402 illustrating a close-up view of the Tampa Bay area. The coloration included in map 400 may be based on gradient values from a plurality of BWTDs 106 (FIG. 1), where the gradient values are based on a density filter for a density monitoring attribute. For example, map 400 may be generated using an np.histogram2d( ) function in the numpy library of the Python programming language. Data layer 226 (FIG. 2) may include an SQL database to manage the data. The connection to SQL may be implemented using a pymssql library.

The example of FIG. 4 illustrates a histogram may be composed of a number of cells, with each cell corresponding to a geographical region. In this example, each cell may have a respective gradient value, where the gradient values are determined based on the number of points that appear within the cell. That is, each cell may contain a count of the offender data points that appear within that geographical unit.

In another example, a representation of the density of offender locations may be produced using the base R plotting library of the Python programming language. In this example, transparency of plot points may be used to indicate a density of offender positions. For example, location data from BWTDs 106 may be filed to a particular area, such as the state of Florida. Plot points may be generated as circles having an alpha level of 1/256 (where 1 is perfectly opaque). Hence, a highly transparent region has a relatively low density of data points, while an opaque region has a relatively high density of data points.

Map 400 may be generated by aggregating data from thousands of offenders. In other examples, maps of individual offender data may be generated based on gradient values for the offender. While map 400 only represents a density monitoring attribute, it should be understood that other graphical representations of gradient values may include additional or different monitoring attributes.

Figure 5:
FIG. 5 is an illustration of another graphical user interface generated for display by a computing device, in accordance with techniques of this disclosure.

FIG. 5 is an illustration of another graphical user interface generated for display by a computing device, in accordance with techniques of this disclosure. In general, the example of FIG. 5 illustrates a heatmap of a density of BWTDs 106 (FIG. 1). For example, the techniques described herein may include generating heatmaps that may graphically illustrate the behavior and movements of the offenders, as indicated by determined gradient values. In some examples, such heatmaps may be used by law enforcement, in order to prioritize areas for police patrols and the establishment of precincts (e.g., close to the centers of movement of monitored persons 106). Such heatmaps may also be used by city planners, to choose where to build schools, daycare facilities, housing developments and governmental services facilities (e.g., far from the centers of criminal movement).

In some instances, parole officers may use a heatmap generated using the disclosed techniques as an instruction tool when coaching monitored persons 106, e.g., with instructions to avoid particular areas indicated by the heatmap. In other instances, heatmaps or other visual representations that represent gradient values may be made available to other parties, such as victims of a crime, so that the parties are able to avoid particular geographical regions. Such information may be of particular relevance in the case of restraining orders.

Again, as described herein, density is only one example of a monitoring attribute for which a gradient value may be determined and for which a heatmap similar to that shown in FIG. 5 may be created. In some examples, the techniques include generating heatmaps that illustrate locations in which violations occur for one or more of monitored persons 104. In other examples, graphical representations may highlight movement of BWTDs 106 into particular zones, such as zones designated as being forbidden for monitored persons 104. In still other examples, the techniques may be used to generate a graphical representation of anomalous movement for one or more monitored persons 104. For example, typical patterns of movement may be established for monitored persons 104. The techniques may include determining a gradient value associated with an anomalous movement monitoring attribute, where the gradient value indicates a level of movement that is different than the typical patterns of movement.

In some examples, monitoring users 118 (FIG. 1) may edit the data contributing to gradient values and graphical representations prior to generating the graphical representations. For example, monitoring users 118 may determine points correspond to acceptable movement (e.g., points that correspond to the daily commutes between home and work)

and subtract such points from a graphical representation. The result may include a heatmap that highlights anomalous movements. The "accepted" points may be defined by monitoring users 118 (e.g., parole officers or other law enforcement officers), using software (e.g., a graphical user interface where the officer clicks on portions of the heatmap and labels those portions as "acceptable"). As described herein, graphical representations may be generated for specific offenders or aggregated over groups of offenders, e.g., according to offender attributes.

Figure 6:
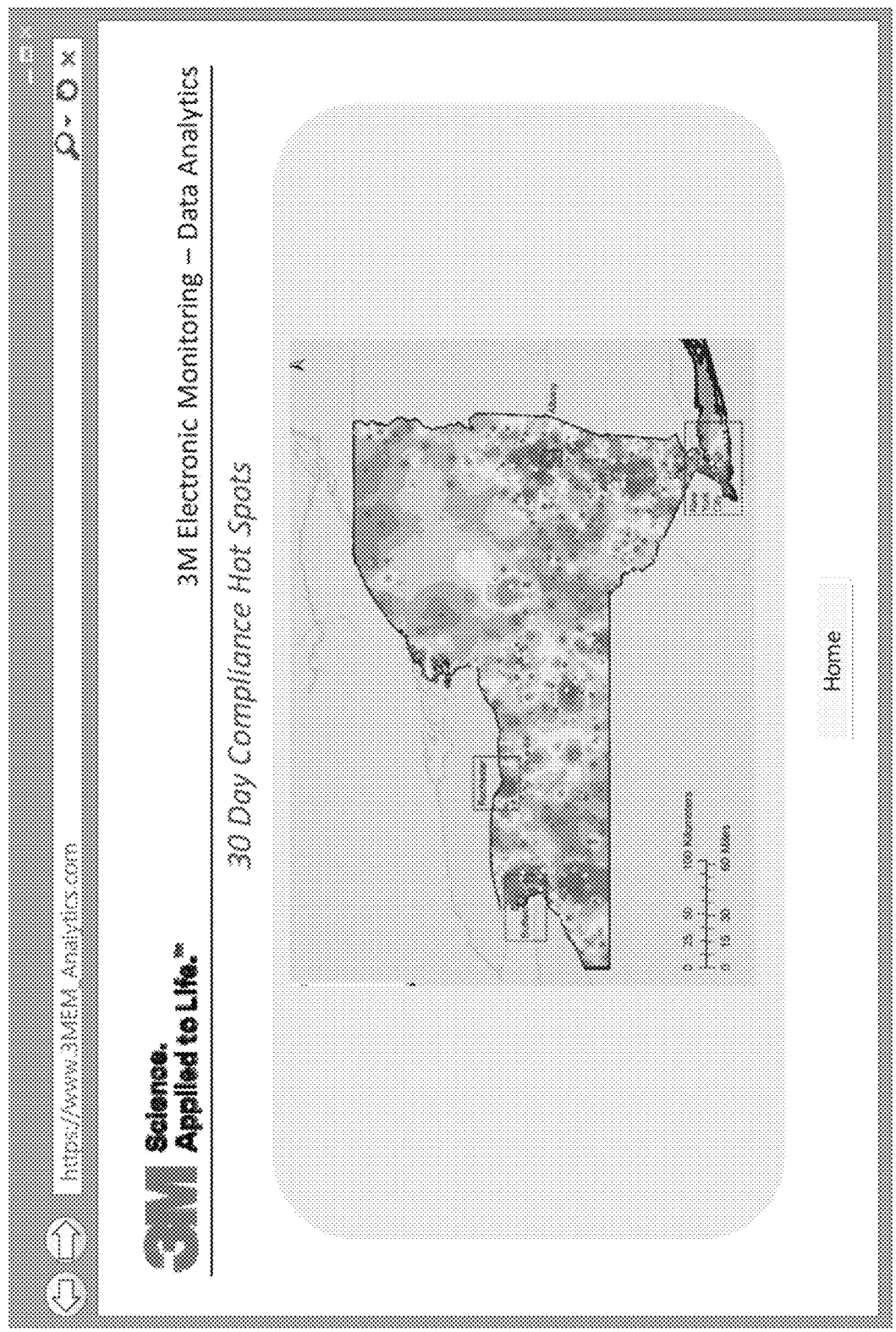
FIG. 6 is an illustration of another graphical user interface generated for display by a computing device, in accordance with techniques of this disclosure.

FIG. 6 is an illustration of another graphical user interface generated for display by a computing device, in accordance with techniques of this disclosure. The example of FIG. 6 generally illustrates gradient values that represent a density of BWTDs 106 over a particular geographical region (e.g., the state of New York). In addition, the gradient values may be generated using a time filter, such that location data from a 30-day window contributes to the gradient values.

Figure 7:
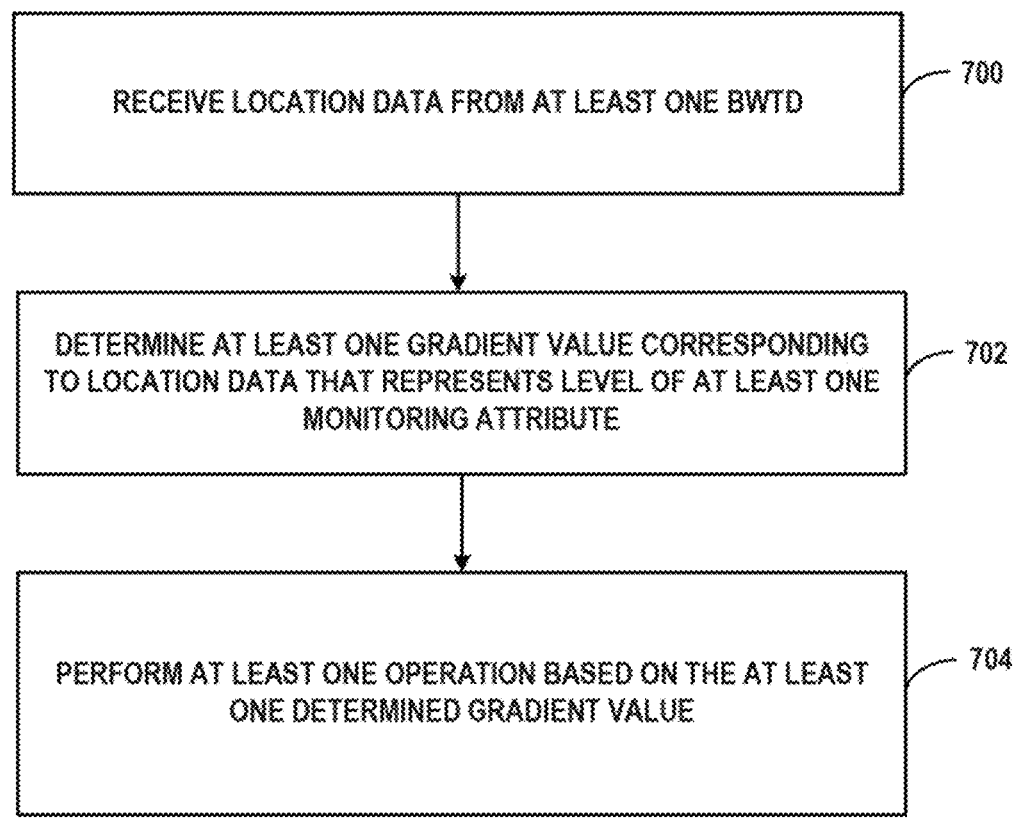
FIG. 7 is a flow diagram illustrating example operations of a computing device configured to determine one or more values that represent a monitoring attribute for one or more body-worn tracking devices, in accordance with techniques of this disclosure.

FIG. 7 is a flow diagram illustrating example operations of a computing device configured to determine one or more values that represent, a monitoring attribute for one or more body-worn tracking devices, in accordance with techniques of this disclosure. While described with respect to the system shown in FIG. 1, it should be understood that the process described with respect to FIG. 7 may be carried out by a variety of other computing systems.

In the illustrated example, monitoring center 112 may receive location data from at least one of BWTDs 106 (702). Monitoring center 11 may determine at least one gradient value 122 corresponding to the received location data that represents a level at least one monitoring attribute. As described herein, example monitoring attributes may include a location (e.g., latitude, longitude) of one or more of BWTD 106, a density of BWTDs 106 in a geographic area, a time of day, a signal strength measured b BWTDs 106 (e.g., a signal strength between satellites 108 and BWTDs 106), a directional heading of BWTDs 106, a type of offense of monitored persons 104, a degree of offense of monitored persons 104, a speed at which BWTDs 106 are traveling, whether BWTD 106 are at rest, an ambient temperature in which BWTDs 106 are located, whether BWTDs are in motion without a signal for determining location, whether BWTDs 106 have committee a geographical violation, or the like.

Gradient values 122 may be any quantitative value that represents a characteristic of BWTD 106 or monitored persons 104. Gradient values 122 may be based on a set of weighted filters that are associated with the monitoring attributes. For example, each monitoring attribute may be assigned a weight, such that the attribute contributes relatively more or less to the gradient value according to the filter weight.

Monitoring center 112 may perform at least one operation based on the determined one or more gradient values (704). For example, monitoring center 112 may generate graphical representations of the gradient values, such as the heatmaps shown in FIGS. 4-6. In other examples, monitoring center 112 may generate one or more notifications based on gradient values exceeding a threshold.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor", as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the example, certain acts or events of any of the methods described herein can be performed in a different sequence, may be added, merged, or left out altogether (e.g., not all described acts or events are necessary for the practice of the method). Moreover, in certain examples, acts or events may be performed concurrently, e.g., through multi-threaded processing, interrupt processing, or multiple processors, rather than sequentially.

In some examples, a computer-readable storage medium includes a non-transitory medium. The term "non-transitory" indicates, in some examples, that the storage medium is not embodied in a carrier wave or a propagated signal. In certain examples, a non-transitory storage medium stores data that can, over time change (e.g., in RAM or cache).

Various examples have been described. These and other examples are within the scope of the following claims.

What is claimed is:

1. A system comprising:
   at least one body-worn tracking device (BWTD) configured to transmit location data that indicate a location of the BWTD; and
   a computing system configured to communicate with the at least one BWTD, the computing system configured to:
      receive the location data from the at least one BWTD;
      determine, based on a set of weighted filters associated with at least one monitoring attribute, at least one gradient value corresponding to the location data, wherein the at least one gradient value represents a level of the at least one monitoring attribute; and
      perform at least one operation based on the at least one gradient value
   wherein to perform the at least one operation, the computing system is configured to:
   generate a graphical user interface (GUI) data for a GUI that comprises a geographical location and a grid of bins corresponding to the geographical location; and
      determine, for respective bins of the grid of bins of the GUI, a variable display attribute that varies based on the at least one gradient value,
   wherein to determine the variable display attribute, the computing system is configured to determine a coloration of respective bins based on the at least one gradient value.

2. The system of claim 1,
   wherein the at least one BWTD comprises a plurality of BWTDs,
   wherein the set of weighted filters comprises a density filter,
   wherein the at least one monitoring attribute comprises a density of the plurality of BWTDs in a geographical location, such that the gradient value represents the density of the plurality of BWTDs in the geographical location
   wherein the set of weighted filters further comprises a time filter,
   wherein the at least one monitoring attribute comprises a time-based density of the plurality of BWTDs in the geographical location over a time defined by the time filter, such that the gradient value represents the time-based density, and
   wherein the time filter comprises a weighted time filter such that the computing device is configured to weight the at least one gradient value based on a recency of the location data.

3. The system of claim 1, wherein the computing system is further configured to:
   determine at least one second monitoring attribute based on the location data;
   generate, for display at the GUI, one or more graphical elements based on the at least One second monitoring attribute.

4. The system of claim 3, wherein die at least one second monitoring attribute comprises whether the at least one BWTD is at rest, whether with at least one BWTD is in motion without communicating with a Global Positioning System (GPS) satellite, or whether the at least one BWTD is located outside of a permissible geographical region.

5. The system of claim 1,
   wherein the set of weighted filters comprises a type of offense filter,
   wherein the at least one monitoring attribute comprises a type of offense committed by an offender associated with the at least one BWTD, such that the gradient value represents the type of offense.

6. The system of claim 1,
   wherein the set of weighted filters comprises a degree of offense filter, and
   wherein the at least one monitoring attribute comprises a degree of offense committed by an offender associated with the at least one BWTD, such that the gradient value represents the degree of offense.

7. The system of claim 1,
   wherein the set of weighted filters comprises a speed filter,
   wherein the at least one monitoring attribute comprises a speed with which the at least one BWTD is moving, such that the gradient value represents the speed.

8. The system of claim 1,
   wherein the set of weighted filters comprises a time of day filter, and
   wherein the at least one monitoring attribute comprises a time of day at which the location data is captured, such that the gradient value represents the time of day.

9. The system of claim 1,
   wherein the at least one BWTD comprises a plurality of BWTDs,
   wherein the set of weighted filters comprises a density filter and a compliance filter, and
   wherein the at least one monitoring attribute comprises a density of non-compliant BWTDs of the plurality of BWTDs in a geographical location, such that the gradient value represents the density of non-compliant BWTDs of the plurality of BWTDs in the geographical location.

10. The system of claim 1, wherein the at least one BWTD comprises a plurality of BWTDs, wherein the computing system is configured to determine the plurality of BWTDs based on an offense of offenders associated with the plurality of BWTD.

11. The system of claim 1, wherein to perform the at least one operation, the computing system is configured to:
   generate, based on the at least one gradient value exceeding a threshold, alert data for an audible, visual, or tactile alert; and
   transmit the alert data to a computing device.

12. The system of claim 1, wherein the location data comprise GNSS data.

13. A computer-implemented method, the method comprising:
   receiving location data from at least one body-worn tracking device (BWTD), wherein the location data that indicates a location of the at least one BWTD;
   determining, based on a set of weighted filters associated with at least one monitoring attribute, at least one gradient value corresponding to the location data, wherein the at least one gradient value represents a level of the at least one monitoring attribute; and performing at least one operation based on the at least one gradient value wherein performing the at least one operation comprises:
generating a graphical user interface (GUI) data for a GUI that comprises a geographical location and a grid of bins corresponding to the geographical location; and
determining, for respective bins of the grid of bins of the GUI, a variable display attribute that varies based on the at least one gradient value,
wherein determining the variable display attribute comprises determining a coloration of respective bins based on the at least one gradient value.

14. The computer-implemented method of claim 13,
wherein the at least one BWTD comprises a plurality of BWTDs,
wherein the set of weighted filters comprises a density filter,
wherein the at least one monitoring attribute comprises a density of the plurality of BWTDs in a geographical location, such that the gradient value represents the density of the plurality of BWTDs in the geographical location,
wherein the set of weighted filters further comprises a time filter, and
wherein the at least one monitoring attribute comprises a time-based density of the plurality of BWTDs ire the geographical location over a time defined by the time filter, such that the gradient value represents the time-based density,
wherein the time filter comprises a weighted time filter based on a recency of the location data.

15. The computer-implemented method of claim 13, wherein the method thither comprises:
determining at least one second monitoring attribute based on the location data; and
generating, for display at the GUI, one or more graphical elements based on the at least one second monitoring attribute
wherein the at least one second monitoring attribute comprises whether the at least one BWTD is at rest, whether with at least one BWTD is in motion without communicating with a Global Positioning System (GPS) satellite, or whether the at least one BWTD is located outside of a permissible geographical region.

16. The computer-implemented method of claim 13,
wherein the set of weighted filters comprises a type of offense filter,
wherein the at least one monitoring attribute comprises a type of offense committed by an offender associated with the at least one BWTD, such that the gradient value represents the type of offense,
wherein the set of weighted filters comprises a degree of offense filter, and
wherein the at least one monitoring attribute comprises a degree of offense committed by an offender associated with the at least one BWTD, such that the gradient value represents the degree of offense.

17. The computer-implemented method of claim 13,
wherein the at least one BWTD comprises a plurality of BWTDs,
wherein the set of weighted filters comprises a density filter and a compliance filter, and
wherein the at least one monitoring attribute comprises a density of non-compliant BWTDs of the plurality of BWTDs in a geographical location, such that the gradient value represents the density of non-compliant BWTDs of the plurality of BWTDs in the geographical location.

18. The computer-implemented method of claim 13, wherein the at least one BWTD comprises a plurality of BWTDs, wherein the method comprises determining the plurality of BWTDs based on an offense of offenders associated with the plurality of BWTDs
wherein performing the at least one operation comprises:
generating, based on the at least one gradient value exceeding a threshold, alert data for an audible, visual, or tactile alert; and
transmitting the alert data to a computing device.

19. The computer-implemented method of claim 13, wherein the location data comprises GNSS data.

* * * * *